United States Patent [19]
Lee

[11] Patent Number: 6,021,138
[45] Date of Patent: Feb. 1, 2000

[54] DIGITAL CORDLESS TELEPHONE SYSTEM FOR A PRIVATE AUTOMATIC BRANCH EXCHANGE

[75] Inventor: Seung-Bum Lee, Seoul, Rep. of Korea

[73] Assignee: Daewoo Telecom, Ltd., Incheon, Rep. of Korea

[21] Appl. No.: 08/893,157

[22] Filed: Jul. 15, 1997

[30] Foreign Application Priority Data

Jul. 15, 1996 [KR] Rep. of Korea ...................... 96-28551

[51] Int. Cl.[7] .............................. H04J 3/12; H04L 12/28; H04L 12/56
[52] U.S. Cl. ..................... 370/524; 370/524; 370/522; 370/419; 370/420; 455/465; 455/554; 455/555
[58] Field of Search ..................... 455/465, 554, 455/555; 379/58, 60; 370/419, 420, 522, 524, 538, 542, 535, 77, 59, 29.1, 95, 110

[56] References Cited

U.S. PATENT DOCUMENTS

| | | | |
|---|---|---|---|
| 4,975,939 | 12/1990 | Sasaki | 379/60 |
| 5,259,017 | 11/1993 | Langmantel | 379/58 |
| 5,416,779 | 5/1995 | Barnes et al. | 370/29.1 |
| 5,442,684 | 8/1995 | Hashimoto et al. | 379/61 |
| 5,473,668 | 12/1995 | Nakahara | 379/58 |
| 5,493,605 | 2/1996 | Akiyama et al. | 379/61 |
| 5,544,226 | 8/1996 | Weis et al. | 379/61 |

*Primary Examiner*—Michael Horabik
*Assistant Examiner*—Man V. Phan
*Attorney, Agent, or Firm*—Pennie & Edmonds LLP

[57] ABSTRACT

A digital cordless telephone system comprises a multiplicity of subscriber cordless handsets (HS's) with a subscriber number of a private automatic branch exchange (PABX) being assigned to one or more of the HS's, a plurality of base stations (BS's), each of the BS's being coupled with one or more of the HS's by radio channels for controlling a radio link between each of the BS's and each of the HS's, and a system connecting unit coupled with the BS's and the PABX for allowing only authenticated HS's to initiate outgoing calls and for keeping track of each of the HS's to set up calls for the HS's whenever the HS's are within the service area of one of the BS's.

5 Claims, 2 Drawing Sheets

DIGITAL CORDLESS TELEPHONE SYSTEM FOR A PRIVATE AUTOMATIC BRANCH EXCHANGE

FIELD OF THE INVENTION

The present invention relates to a digital cordless telephone system; and, more particularly, to a digital cordless telephone system connected to a private automatic branch exchange (PABX).

BACKGROUND OF THE INVENTION

Generally, in most office, hospital or plant-type buildings, telephone services are provided using a conventional PABX system which comprises a PABX connected to a public switched telephone network and subscriber telephones linked to the PABX via subscriber lines. The PABX system offers certain advantages and convenience to the subscribers thereof. For instance, the use of the PABX system is inexpensive since the calls are made through wired land channels; and intra-PABX calls can be made by merely dialing subscriber numbers without pressing exchange codes.

Since, however, subscriber telephones of the PABX system are of a cord-type in most cases, a subscriber will not be able to make or take a call when he is not within immediate vicinity of his telephone; resulting in limited accessibility to the subscribers.

On the other hand, the use of digital cordless telephone system or digital cellular phone system such as personal communication services (PCS) and cordless phone 2 (CT-2) are gaining popularity in recent years; and such digital cordless telephone systems provide mobile public access to the users thereof as long as they are within the service area thereof. However, the use of digital cordless telephone systems still remains costly because the signaling within the system is carried out by radio channels through air.

Accordingly, it would be desirable to devise a system taking advantage of both the cost-effectiveness and convenience of the PABX system and the mobile public accessibility of a digital cordless telephone system.

SUMMARY OF THE INVENTION

It is, therefore, a primary object of the present invention to provide a digital cordless telephone system connected to a private automatic branch exchange.

In accordance with the present invention, there is provided a digital cordless telephone system comprising:

a multiplicity of subscriber cordless handsets (HS's) with a subscriber number of a private automatic branch exchange (PABX) being assigned to one or more of the HS's;

a plurality of base stations (BS's), each of the BS's being coupled with one or more of the HS's by radio channels for controlling a radio link between each of the BS's and each of the HS's; and a system connecting unit coupled with the BS's and the PABX for allowing only authenticated HS's to initiate outgoing calls and for keeping track of each of the HS's to set up calls for the HS's whenever the HS's are within the service area of one of the BS's.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
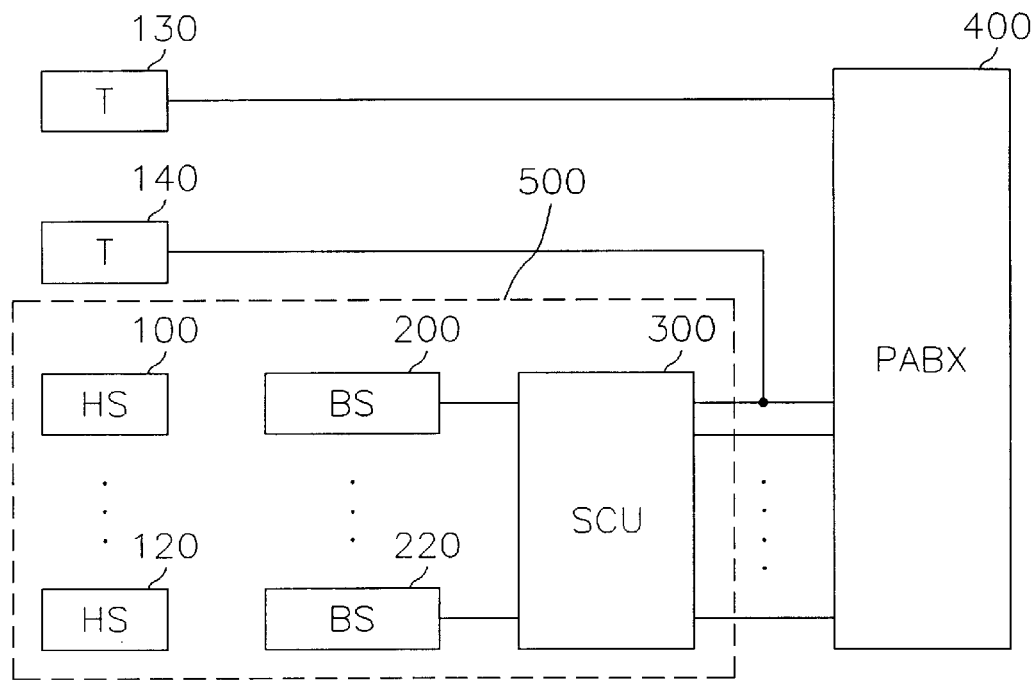
FIG. 1 provides a block diagram of a digital cordless telephone system of the present invention.

Referring to FIG. 1, there is provided a block diagram of the inventive digital cordless telephone system 500 which comprises a plurality of HS's, e.g., HS's 100 to 120, a multiplicity of base stations (BS's), e.g., BS's 200 to 220, and a system connecting unit (SCU) 300 connected to a PABX 400. The SCU 300 of the digital cordless telephone system 500 is coupled with the PABX 400 via subscriber lines, e.g., standard analog subscriber wires, like conventional cord-type telephones (T's) 130 to 140.

Each of the HS's 100 to 120 is connected to one of the BS's 200 to 220 by radio channels. A 32 kbps adaptive differential pulse code modulation (ADPCM) speech signal is transferred between one of the HS's and one of the BS's and a predetermined CAI (Common Air Interface) protocol is used for digital signaling therebetween.

In the digital cordless telephone system 500, each of the HS's 100 to 120 is distinguished by its own PID (portable identification code) and each of the BS's 200 to 220 by its own BID (BS identification code).

For example, same subscriber number is assigned to the PID of the HS 100 and the T 140, i.e., a call for the HS 100 is transferred via the subscriber line dedicated to the T 140.

Each of the BS's 200 to 220 is coupled with the SCU 300 by a subscriber line, e.g., a subscriber cable having the capability of an ISDN (Integrated Services Digital Network) basic rate access interface (BRI) including two B type channels of a transfer speed 64 kbps and one D type channel of a transfer speed 16 kbps. At each of the BS's 200 to 220, the CAI protocol is converted to an ISDN signaling protocol and vice versa.

At the SCU 300, location registration and authentication for the HS's 100 to 120 are performed. Location registration is performed in order to keep track of current location for each of the HS's 100 to 120. Authentication is performed in order to provide the cordless telephone service to only registered HS's 100 to 120. For the sake of simplicity, authentication and location registration procedures is described with respect to the HS 100 only.

The SCU 300 includes location information representing the BS within which service area the HS 100 is currently located in. The location information is inputted by an operator initially and updated periodically and whenever the HS 100 initiates an outgoing call.

The HS 100 receives and records the BID transmitted from one of the BS's 200 to 220. And then, at the HS 100, currently received BID is compared with a previously recorded BID. If both BID's are not identical, the HS 100 generates a registration request message to transfer, to the SCU 300 via the BS, the currently received BID, e.g., BS 200. At the SCU 300, the HS 100 is registered to be within the service area or the BS 200. If otherwise, the HS 100 does not generate the registration request message and remains to be within the service area of the previously recorded BID.

On the other hand, the SCU 300 includes authentication information, inputted by an operator, representing the PID for the HS 100 and its corresponding subscriber number, e.g., the subscriber number of the T 140.

Whenever the HS 100 initiates an outgoing call, the PID thereof is transmitted to the corresponding BS, e.g., the BS 200. The BS 200 generates and transfers an authentication request message for the PID to the SCU 300. At the SCU 300, it is checked whether or not the PID is registered for one of the subscriber numbers of the PABX.

The SCU 300 is coupled with the PABX 400 by subscriber lines, e.g., standard analog subscriber wires, wherein the PABX 400 is a known PABX 400 which is connected to a public switched telephone network (not shown).

Figure 2:
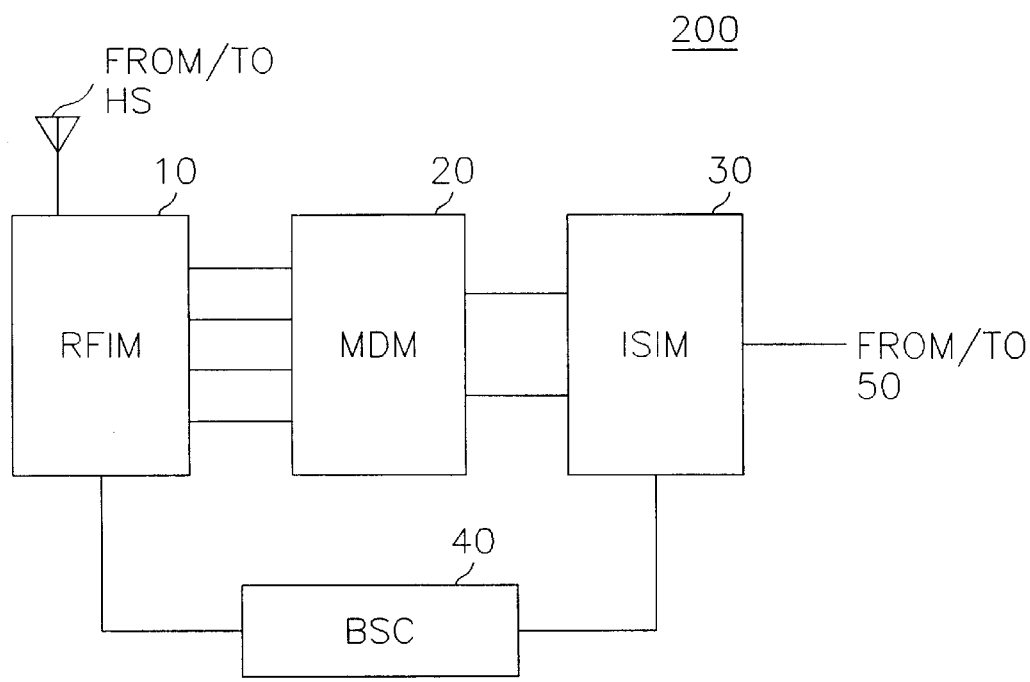
FIG. 2 represents a block diagram of a base station shown in FIG. 1.

Turning now to FIG. 2, there is provided a block diagram of a preferred embodiment of the inventive BS 200 which includes a radio frequency interfacing module (RFIM) 10, a multiplex/demultiplexing module (MDM) 20, an ISDN subscriber interfacing module (ISIM) 30 and a BS controller (BSC) 40. The other BS's are substantially identical to the BS 200; and, therefore, their operation or structure will not be explained here.

The BS 200 of the present invention has a capability of handling four speech channels. It will be described for an up-stream signal from the subscriber handset, e.g., HS 100. At the RFIM 10, speech and control signals from the HS 100 are processed by employing a conventional radio interfacing technique so that it can be interfaced to the HS 100 as depicted in FIG. 1.

The 32 kbps up-stream ADPCM signal is applied to the MDM 20 with three ADPCM signals for three other channels. Four 32 kbps ADPCM signals are multiplexed to two 64 kbps signals at the MDM 20. The two 64 kbps signals are applied to the ISIM 30.

The control message signal is applied from the RFIM 10 to the BSC 40. At the BSC 40, the CAI protocol signal is converted to a 16 kbps ISDN D channel protocol signal recommended by Q.921 and Q.931 issued by ITU (International Telecommunication Union). The 16 kbps D channel signal is then applied to the ISIM 30.

The ISIM 30 is coupled with the MDM 20 and the BSC 40 for assembling two 64 kbps speech signals from the MDM 20 and the 16 kbps ISDN D channel protocol signal from the BSC 40 into a 144 kbps ISDN BRI signal. The ISDN BRI signal is transferred to the SCU 300 by a subscriber cable which is capable of transferring the 144 kbps ISDN BRI signal.

Figure 3:
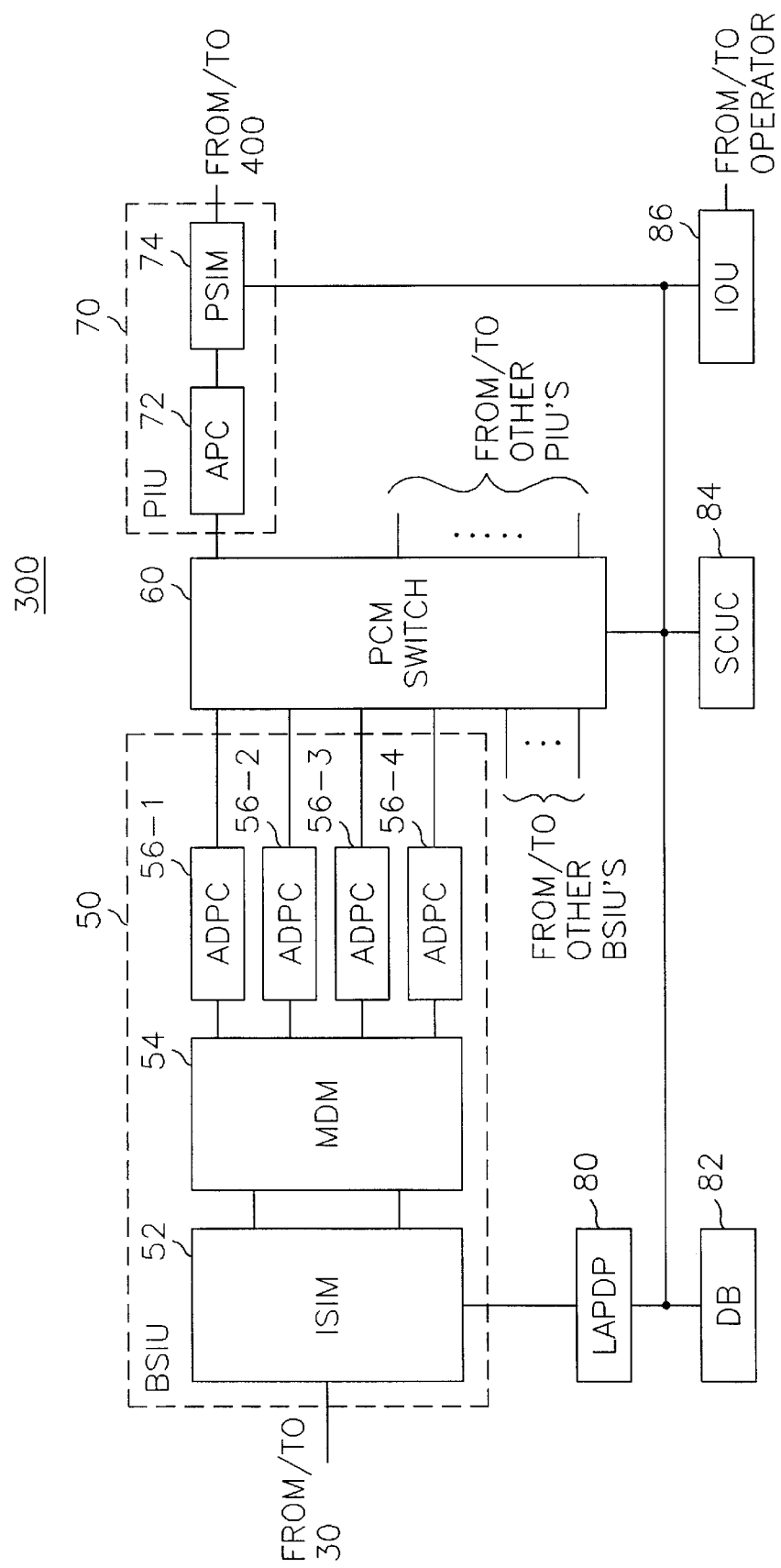
FIG. 3 offers a block diagram of the system connecting unit shown in FIG. 1.

FIG. 3 presents a block diagram of a preferred embodiment of the inventive SCU 300 which includes a plurality of BS interfacing units (BSIU's), e.g., the BSIU 50, a PCM switch 60, a multiplicity of PABX interfacing units (PIU's), e.g., the PIU 70, a LAPD (Link Access Procedure on the D channel) processor (LAPDP) 80, a database (DB) 82, an SCU controller (SCUC) 84, and an input/output unit (IOU) 86. The BSIU 50, corresponding to the BS 200, has an ISIM 52, an MDM 54, and four ADPCM/PCM converters (ADPC's) 56-1 to 56-4. The four ADPC's 56-1 to 56-4 correspond to four channels and identical to each other. The PIU 70 corresponding to the subscriber number assigned to the HS 100, includes an analog/PCM converter 72 and a PABX subscriber interfacing module (PSIM) 74.

The ISIM 52 is connected to the ISIM 30 of the BS 200 via the ISDN subscriber cable. At the ISIM 52, the 144 kbps up-stream ISDN BRI signal from the ISIM 30 is disassembled to a pair of 64 kbps ADPCM speech signals and a 16 kbps D channel signal. The two 64 kbps speech signals are applied to the MDM 54. And the 16 kbps D channel signal is applied to the LAPD processor (LAPDP) 80.

At the MDM 54, each of the 64 kbps speech signals from the ISIM 52 is demultiplexed to two 32 kbps ADPCM signals. The two 32 kbps ADPCM signals from the HS 100 are then applied to one of the ADPC's 56-1 to 56-4, e.g., the ADPC 56-1.

At the ADPC 56-1, the 32 kbps ADPCM signal from the MDM 54 is converted to a 64 kbps PCM signal. The 64 kbps PCM signal is applied to the PCM switch 60, wherein time slot switching is performed.

At the PCM switch 60, the 64 kbps PCM signal for the HS 100 is exchanged between the ADPC 56-1 and the PIU 70 since the PIU 70 corresponds to the subscriber number assigned to the HS 100.

At the APC 72 of the PIU 70, the 64 kbps PCM signal from the PCM switch 60 is converted to an analog signal, which, in turn, is applied to the PSIM 74.

At the PSIM 74, a ringing signal from the PABX 400 is detected and hook-on/off signal is generated for the HS 100.

On the DB 82, there are stored the location information and the authentication information for each of the HS's 100 to 120. The DB 82 is initialized by using the location information and the authentication information inputted by the operator to the IOU 86.

The IOU 86 displays information stored on the DB 82 to help the operator find out the location of the subscriber.

At the LAPDP 80, the D channel protocol signals from the ISIM 52 are analyzed to generate a corresponding control message for the SCUC 84.

The SCUC 84 retrieves and updates the location information on the DB 82 for keeping track of the HS's 100 to 120. And the SCUC 84 retrieves the registration information for authenticating the HS's 100 to 120. And also, the SCUC 84 controls the PCM switch 60 to connect one of the ADPC's, e.g., the ADPC 56-1, to one of the PIU's, e.g, the PIU 70. The SCUC 84 controls the PIU 70 to generate the hook-on/off signal. The SCUC 84 controls the LAPDP 80 to generate the LAPD channel signal.

Now, a down-stream signal from the PABX 400 will be described. At the PSIM 74, a ringing signal from the PABX is detected when the corresponding HS 100 is paged. The ringing signal is analyzed to provide a corresponding control message for the SCUC 84.

The control messages from the PSIM 74 are processed at the SCUC 84 to generate the control message for the LAPDP 80. At the LAPDP 80, the 16 kbps D channel signal is formed based on the control message from the SCUC 84

An analog speech signal from the PABX 400 is inputted to the APC 72 via the PSIM 74. At the APC, the analog speech signal is converted to form a 64 Kbps PCM signal.

At the PCM switch 60, the 64 Kbps PCM signal from the APC 72 is switched to the corresponding ADPC 56-1. At the ADPC 56-1, the 64 Kbps PCM signal is converted to a 32 kbps ADPCM signal. Four 32 kbps ADPCM signals from each of the ADPC's 56-1 to 56-4 are assembled to form two 64 kbps speech signals at the MDM 54.

At the ISIM 52, the two 64 kbps PCM speech signals from the MDM 54 and the 16 kbps D channel signal from the LAPDP 80 are assembled to form a 144 kbps ISDN BRI signal. And the 144 kbps assembled signal is transferred to the ISIM 52 of the BS 200.

Turning to FIG. 2, at the ISIM 30, the down-stream ISDN BRI signal from the SCU 300 is disassembled to two 64 kbps speech signals and a 16 kbps D channel signal. The two 64 kbps speech signals is applied to the MDM 20 to be demultiplexed to form four 32 kbps signals. And the 16 kbps D channel signal is applied to the BSC 40. At the BSC 40, the D channel signal is converted to the CAI protocol signal. The 32 kbps down-stream ADPCM speech signal and the CAI protocol signal are transmitted to the HS 100 through the RFIM 10.

At first, it is described for initiating an outgoing call from the HS 100. When a call is initiated from the HS 100, the location registration as described above is performed. Since the HS 100 is within the service area of the BS 200, the PID of the HS 100 is transmitted from the HS 100 to the corresponding BS 200 using the CAI protocol. Then, a radio traffic channel is assigned to the HS 100 by the BSC 40. An authentication request message for the PID, generated by the BSC 40, is transmitted to the ISIM 52 of the SCU 300 by using an ISDN D channel protocol.

At the SCU 300, the authentication request message is converted to the control message for the LAPDP 80. Upon Receipt of the control message from the LAPDP 80, the SCUC 84 retrieves the DB 82 to check whether or not the PID of the HS 100 is registered for one of the subscriber numbers. And the retrieved corresponding subscriber number for the PID is transferred to the SCUC 84. After checking, the SCUC 84 controls the corresponding PIU 70 to be on the hook-off state since the PIU 70 is dedicated to the subscriber number of the HS 100. And the SCUC 84 controls the PCM switch 60 to provide a speech signal path for the HS 100, i.e., to select one of the ADPC 56-1 to 56-4 to connect to the APC 72.

When the PABX 400 detects the hook-off state of the PIU 70, a call origination tone is transferred to the HS 100 from the PABX 400 via the SCU 300 and the BS 200. The subscriber of the HS 100 dials the destination number using a known DTMF (dual-tone multi-frequency) signaling or a known DP (dual pulse) signaling.

It will now be described with respect to the procedure of receiving incoming call to the HS 100. When the subscriber number of the HS 100 is paged by the PABX 400, the ringing signal is detected at the corresponding PSIM 74 of the HS 100 and then a corresponding control message is transferred from the PSIM 74 to the SCUC 84. The SCUC 84 retrieves the DB 82 to find out the BS 200 in which the HS 100 is located. And then, the PID of the HS 100 is transferred to the corresponding BS 200 after processed at the LAPDP 80.

The BS 200 broadcasts the PID within the service area of the BS 200. When the corresponding HS responds to the SCU 300 via the BS 200, the SCUC 84 controls the PCM switch 60 to select one of the ADPC's 56-1 to 56-4 to connect to the APC 72.

As described above, the digital cordless telephone system 500 is capable of providing outgoing calls from the HS 100 and incoming calls to the HS 100 without restricting the services of the conventional PABX 400.

While the present invention has been shown and described with respect to the particular embodiments, it will be apparent to those skilled in the art that many changes and modifications may be made without departing from the spirit and scope of the invention as defined in the appended claims.

What is claimed is:

1. A digital cordless telephone system comprising:

a multiplicity of subscriber cordless handsets (HS's), a subscriber number of a private automatic branch exchange (PABX) being assigned to one or more of the HS's;

a plurality of base stations (BS's), each of the BS's being coupled with one or more of the HS's by radio channels for controlling a radio link between each of the BS's and each of the HS's, a 32 kbps adaptive differential pulse code modulation (ADPCM) speech signal being transferred between one of the HS's and one of the BS's, wherein each of the BS's includes:

first multiplexing/demultiplexing means for multiplexing four 32 kbps up-stream ADPCM signals to two 64 kbps up-stream speech channel signals and demultiplexing two 64 kbps down-stream speech channel signals to four 32 kbps down-stream ADPCM signals;

first controlling means for converting an up-stream CAI (Common Air Interface) control channel signal to a 16 kbps up-stream ISDN D channel protocol signal and converting a 16 kbps down-stream ISDN D channel protocol signal to a down-stream CAI control channel signal; and first interfacing means for assembling the two 64 kbps up-stream speech channel signals and the 16 kbps up-stream ISDN D channel signal into a 144 kbps up-stream ISDN BRI signal and disassembling a 144 kbps down-stream ISDN BRI signal into two 64 kbps down-stream speech channel signals and the 16 kbps down-stream ISDN D channel signal; and system connecting means coupled with the BS's and the PABX for allowing only authenticated HS's to initiate outgoing calls and for keeping track of each of the HS's to set up calls for the HS's whenever the HS's are within the service area of one of the BS's, wherein said system connecting means is coupled with each of the BS's through a subscriber cable having an ISDN basic rate access interface capability, two B type channels of a transfer speed 64 kbps and a D type channel of a transfer speed 16 kbps being included.

2. The system of claim 1, wherein said system connecting means includes authentication information, representing the subscriber number assigned to one or more of the HS's, inputted by an operator and retrieved when one of the HS's initiates an outgoing call.

3. The system of claim 2, wherein said system connecting means includes location information of each of the HS's, representing the BS of which service area each of the HS's is located in, inputted initially by an operator and retrieved and updated when one of the HS's whose location has been changed initiates an outgoing call.

4. The system of claim 3, wherein said location information is further updated periodically.

5. The system of claim 4, wherein said system connecting means includes:

means for storing the authentication information and the location information of each of the HS's;

second interfacing means for deassembling the 144 kbps up-stream ISDN BRI signal into two 64 kbps up-stream speech channel signals and a 16 kbps up-stream ISDN D channel signal and assembling two 64 kbps down-stream speech channel signals and a 16 kbps down-stream ISDN D channel signal into the 144 kbps down-stream ISDN BRI signal;

second multiplexing/demultiplexing means for demultiplexing the two 64 kbps up-stream speech channel signals to form four 32 kbps up-stream ADPCM speech signals and for multiplexing four 32 kbps down-stream ADPCM speech signals to form the two 64 kbps down-stream speech channel signals;

means for processing the 16 kbps ISDN D channel signal;

first converting means for converting each of four 32 kbps up-stream ADPCM speech signal to a 64 kbps up-stream PCM speech signal and converting each of four 64 kbps down-stream PCM speech signals to a 32 kbps down-stream ADPCM speech signal;

second converting means for converting the 64 kbps up-stream PCM speech signal to an up-stream analog speech signal and converting a down-stream analog speech signal to a 64 kbps down-stream PCM speech signal;

switching means for connecting one of the first converting means to one of the second converting means;

third interfacing means for generating and transferring to the PABX a hook-on/off signal for one of the HS's and detecting a ringing signal from the PABX;

second controlling means for retrieving the authentication information from the storing means to allow only registered HS's to set up calls by using corresponding subscriber numbers of the PABX, updating the location information of the storing means, transceiving control messages from/to the processing means, the switching means and third interfacing means to control them; and means for receiving data from the operator to initialize the storing means and for displaying information on the storing means to the operator.

* * * * *